Feb. 14, 1950 R. E. MULLIN 2,497,465
AIRCRAFT OF THE ROTARY WING TYPE
Filed July 27, 1946 4 Sheets-Sheet 1

INVENTOR.
ROBERT E. MULLIN
BY
Cook & Robinson
ATTORNEYS

Feb. 14, 1950          R. E. MULLIN          2,497,465
AIRCRAFT OF THE ROTARY WING TYPE
Filed July 27, 1946          4 Sheets-Sheet 2
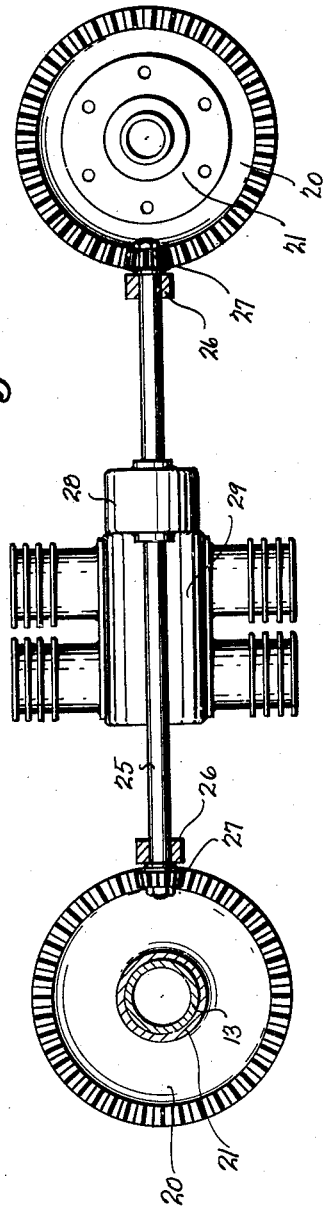
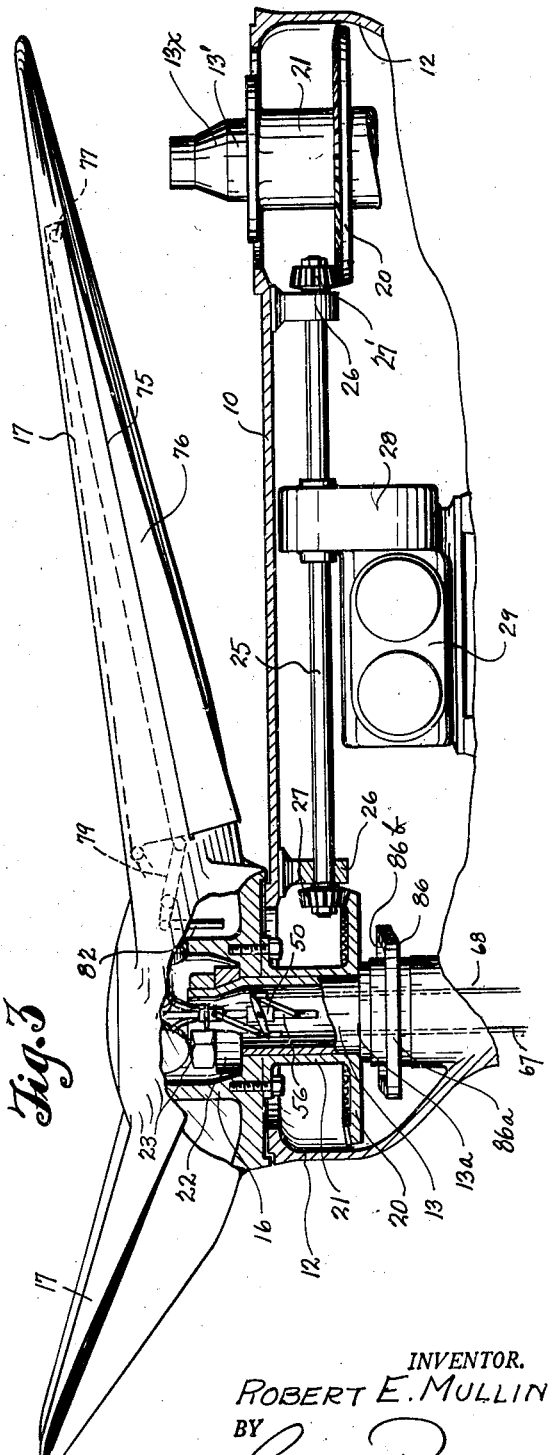
INVENTOR.
ROBERT E. MULLIN
BY Cook & Robinson
ATTORNEYS Feb. 14, 1950
R. E. MULLIN
2,497,465
AIRCRAFT OF THE ROTARY WING TYPE
Filed July 27, 1946
4 Sheets-Sheet 3
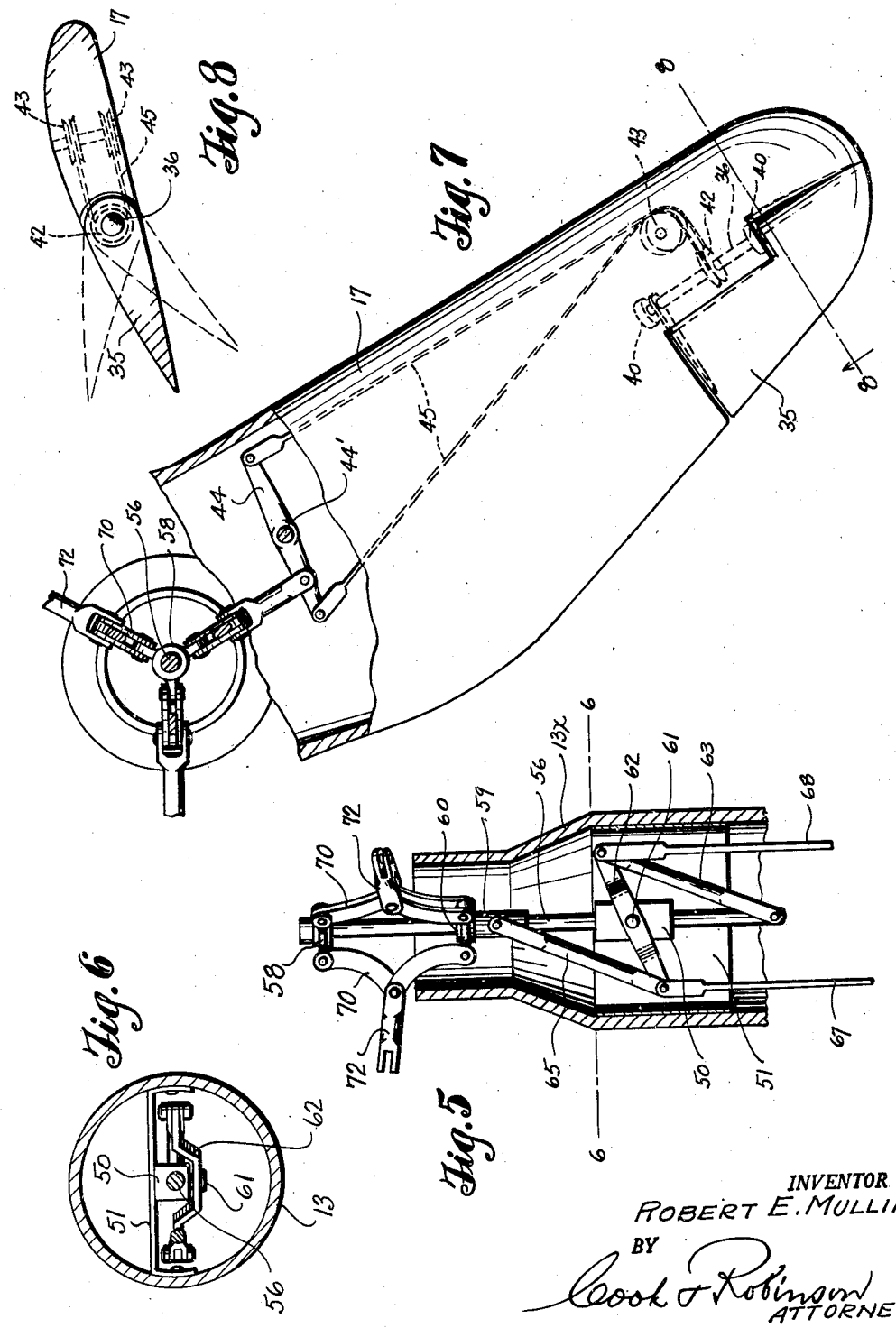
INVENTOR
ROBERT E. MULLIN
BY
Cook & Robinson
ATTORNEYS

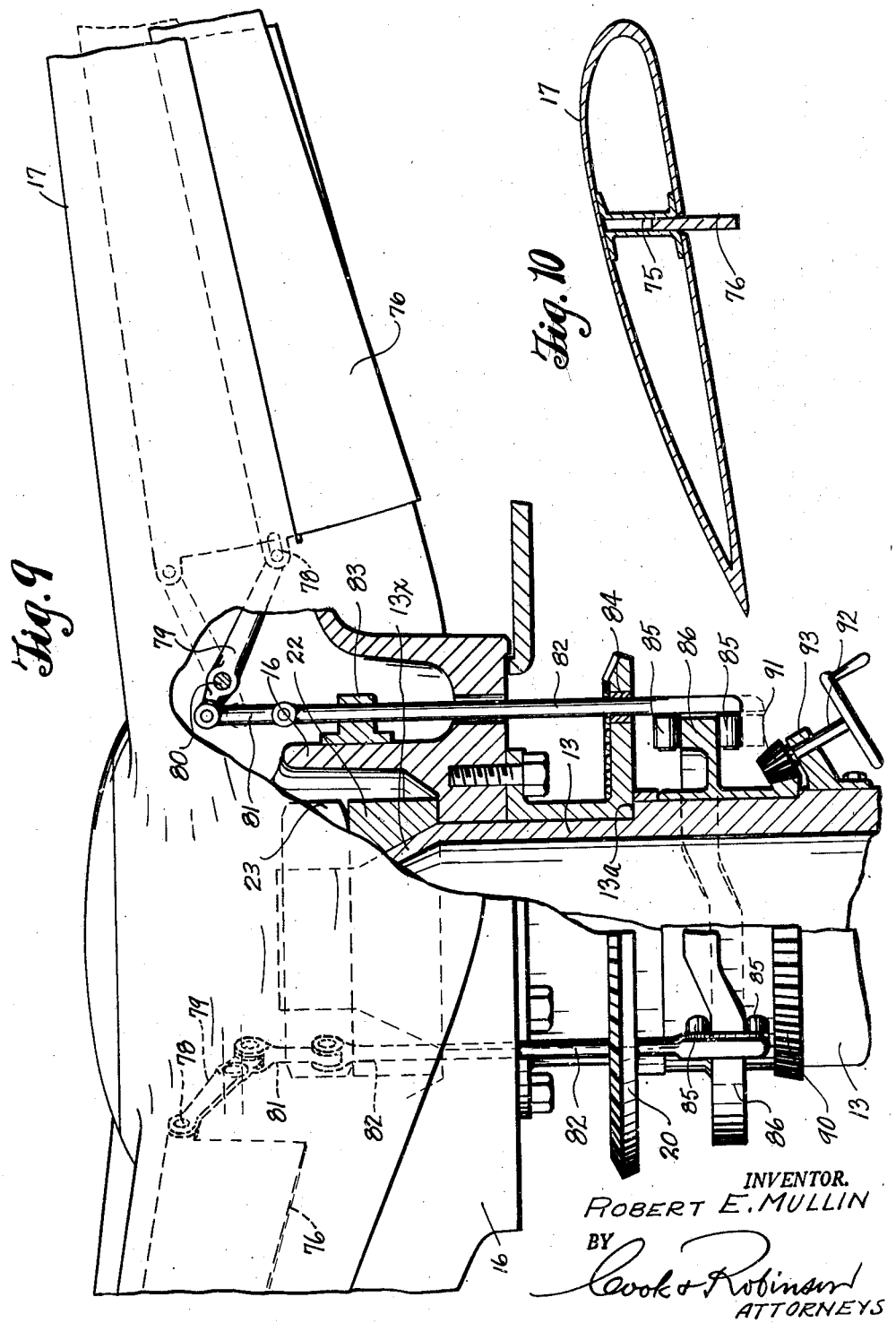

Patented Feb. 14, 1950

2,497,465

UNITED STATES PATENT OFFICE 2,497,465

AIRCRAFT OF THE ROTARY WING TYPE

Robert E. Mullin, Bremerton, Wash.

Application July 27, 1946, Serial No. 686,625

4 Claims. (Cl. 170—160.25)

This invention relates to aircraft, and it has reference more particularly to improvements in aircraft of the rotary wing types generally referred to as helicopters; the principal object of the invention being to provide novel improvements, particularly in wing relationship and parts incorporated in the wings, that provides better hovering and vertical flight ability; that produce greater lifting effect; that provide for better directional control; whereby propulsion or driving force for horizontal directional flight is effected and may be varied through the rotating wings, and whereby better maneuverability and greater speed in such craft is made possible.

It is also an object of this invention to provide an improved aircraft of the character stated and possessing the advantages above stated, that is characterized by a novel use of dual air screws, or rotating wings, and with which air screws novel devices are used for controlling the speed of flight and direction of travel as well as to effect turning and stopping.

Other objects of the invention reside in the details of construction, and combination of parts, and in their relationship and mode of operation, as will hereinafter be fully described.

In accomplishing the above mentioned and other objects of the invention, I have provided the improved details of construction, the preferred forms of which are illustrated in the accompanying drawings, wherein—

Fig. 3 is a longitudinal, sectional detail of the top portion of the fuselage, showing one of the air screws and its mounting and rotating means.

Fig. 4 is a plan, or top view of the engine and its drive shaft as extended to the driving gears of the two air screws.

Fig. 5 is a central, vertical section of one of the air screw mounting spindles, showing the aileron control linkage as contained therein.

Fig. 6 is a horizontal section, on line 6—6 of Fig. 5.

Fig. 7 shows a fragmental plan view of a part of one of the wings of an air screw and aileron control mechanism associated therewith.

Fig. 8 is a cross section taken on line 8—8 in Fig. 7, showing aileron movement.

Fig. 9 is a detail partly in elevation and partly in section of the propulsion fin control devices associated with an air screw.

Fig. 10 is a cross section of a wing showing the disposition of a propulsion fin therein.

Figure 1:
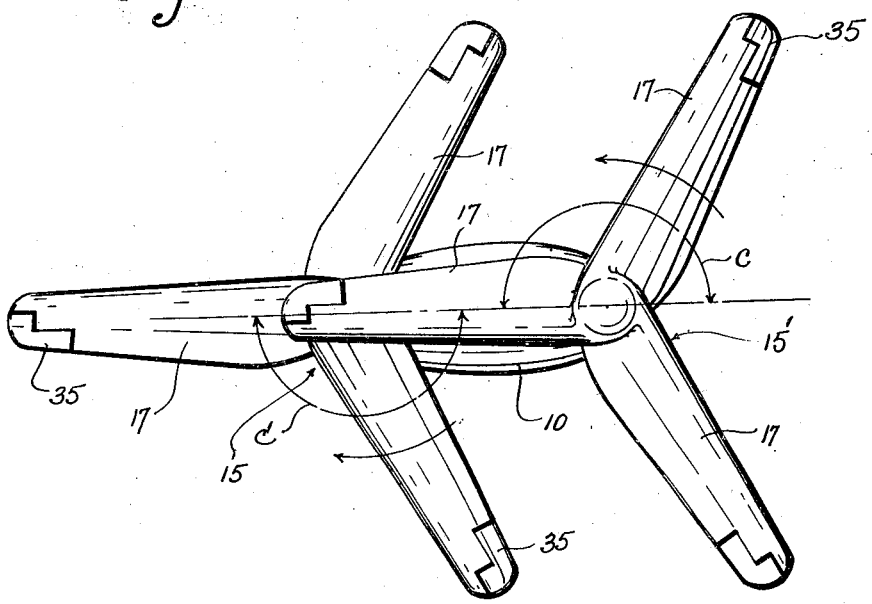
Fig. 1 is a top, or plan view of an aircraft embodying the improvements of the present invention therein.

Referring more in detail to the drawings—

In one of its present preferred forms of construction, the aircraft of this invention comprises a cab or fuselage, designated in its entirety by reference character 10, equipped in suitable manner with landing wheels, designated by numeral 11, preferably having caster type mountings. The fuselage, or cab 10 is of an elongated form, narrow in width and streamlined. At the top and adjacent its ends, the fuselage is formed with suitable bearing housings 12 and 12' open at the top and within which tubular, vertically directed spindles 13 and 13' are fixed, as seen in Fig. 3, for the support and rotation thereon of the air screws which, in Figs. 1 and 2, I have designated in their entireties by reference numerals 15 and 15'.

It will be understood, by reference to Fig. 3, that each air screw is formed with a central, hollow hub portion 16, from which three radially directed and equally angularly spaced wings 17 extend. The two air screws are of the same size and they rotate in the same horizontal plane, but in opposite directions, as presently understood.

Figure 2:
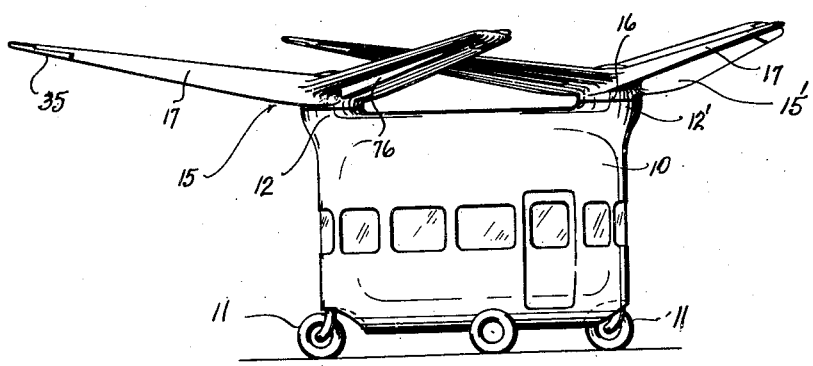
Fig. 2 is a side view of the same.

The relative position of the two air screws as shown in Figs. 1 and 2, is such that they overlap in their operation. However, the inclination of the wings of each is at such an upward degree in their outward extent from the screw axis that in the turning of the screws, the wings of one will pass above those of the other; this being made possible by reason of the fact that one screw is 60° in advance of the other and the screws turn in opposite directions, and thus the radial wings of each maintain a sort of intermeshing relationship between the wings of the other.

Mounted for rotation about each of the spindles 13 is a relatively large beveled gear wheel 20, and each of these has a rather elongated, upwardly extending hub portion 21 that is flanged about its upper end and is bolted through this flange to the flat bottom face of the hub 16 of the air screw for driving the latter. Each gear 20 is supported upon an upwardly facing shoulder 13x of the mounting spindle, and, in turn, supports the air screw for its intended operation.

It is shown in Fig. 3 that the upper end portions of spindles 13 and 13' are tapered as at 13x, to a part of reduced diameter and that these portions extend into the hollow hub portions 16 of the air screws, and that the screws are secured on the spindles by collars 22 that are applied over the tapered portions of the spindles against the base walls of the hubs, and held by nuts 23 that are threaded onto the reduced end portions of the spindles against the collars.

The air screws 15 and 15' are driven in synchronism and in opposite directions by a drive shaft 25 common to both, that is mounted lengthwise of the fuselage, in supporting bearings 26. At its ends, the shaft has bevel gear pinions 27 and 27' fixed thereon and operating in driving mesh with the bevel gears 20 which are fixed to the air screws.

The shaft 25, as observed in Figs. 3 and 4, is operatively connected through a reduction gear mechanism, indicated at 28, with an engine 29. The engine may be of any suitable type for the work to be done, and its controls and accessories are not herein shown as they form no part of the invention; it being understood that they may be of any kind suitable for the work to be done.

Since each air screw is like the other, one only will be described in detail, with the understanding that the description relates equally to both.

The radial wing portions of each air screw are designated by reference numeral 17. Each may be of conventional construction and of a length required for its particular use. In the present instance, each screw has three wings, and each wing is fixed solidly to the central hub portion 16 at 120° intervals. Also, each wing is equipped at its outer end and at its trailing edge with an aileron 35, and this is functionally supported by a hinge shaft 36, as seen best in Figs. 7 and 8, for adjustment between the position in which it is shown in full line and in dotted lines in Fig. 8. The hinge shaft 36 extends in the longitudinal direction of the wing, and is revoluble in supporting bearings 40 fixed in the wing structure. The aileron is fixed in suitable manner to the shaft and is controlled by the shaft movement.

For holding the ailerons in set positions and for effecting an adjustment in their positions, I have provided the hinge shaft 36 of each with a belt wheel 42, fixed to the shaft, and about which a cable 45 is wound. Opposite end portions of the cable extend from the belt wheel, over guide sheaves 43 and 43, revolubly mounted in the wing structure, thence to opposite ends of a lever 44 which is pivoted intermediate its ends on a supporting shaft 44', as shown in Fig. 7.

The levers 44 of the several wings are located relatively close to the hub portion of the screw and the cables 45, as secured to the opposite ends of the levers, are drawn tight so that any movement of a lever will be translated to the corresponding aileron to swing the aileron to different positions of its adjustment.

As understood by the showing in Fig. 7, the levers 44, as mounted in the three wings of each air screw, are normally transverse to the longitudinal lines of the wings. It is desirable that, in this aircraft, all ailerons of each screw should be operated together and to the same extent. Therefore, I have provided mechanism as shown in Figs. 5, 6 and 7 for this mode of operation. The mechanism as shown comprises a guide bearing block 50 that is fixed rigidly within the tubular spindle portion about which the screw rotates by means of a cross plate 51 that is fixed at its ends to the spindle. Vertically slidable through the bearing, and coaxial of the spindle, is a shaft or rod 56, which extends below, and also to a distance substantially above the bearing, and into the hub portion 16 of the air screw. Rotatably fixed on the upper end of the shaft 56 is a collar 58 and slidable on the shaft, at a distance below the collar 58, is a sleeve 59 about which a collar 60 is rotatably fixed.

Pivoted on the bearing 50, by a pivot bolt 61, is a cross lever 62. A link 63 pivotally connects one end of this cross lever with the lower end of shaft 56, and a link 65 likewise pivotally connects the other end of lever 62 with the sleeve 59. The lever 62, as shown in Fig. 5, has downwardly extending actuating rods 67 and 68 pivotally connected to its opposite ends, and when the lever is rocked on its pivot by these rods, it causes the collars 58 and 60 to be shifted toward or from each other accordingly.

Attached pivotally to the collars 58 and 60 in positions in alinement with the three wings, are sets of toggle links 70, each of which sets has pivoted connection with the inner end of a link 72 which is connected at its outer end to the corresponding rocker lever 44.

Thus, it will be understood that under control of the rods 67 and 68, the cross lever 62 may be rocked on its pivot, thereby to simultaneously actuate the three sets of toggle links 70, which, in turn, will actuate to equal extent, the rocker levers 44 of the three wings. The actuation of levers 44 will, through the cable connections 45, control the positions of the ailerons 35. The connection of the toggle linkage 70 with the shaft 56 is such that there is no interference by rotation of the screws.

Rotation of the air screws results in lifting forces being applied to the craft, and the speed of rotation of screws determines the rate of lift or vertical travel. However, if it is desired to cause the craft to move in a forward or backward direction while in horizontal flight, this may be accomplished without change in air screw speed by manipulation of the ailerons on their hinge shaft mountings either to effect an upward push or downward push, for the purpose of fore and aft stability and for gliding effect.

To effect horizontal flight and to control speed of travel, I have provided each of the wings of the two air screws with propelling fins or blades which have been shown to best advantage in Figs. 3, 9 and 10.

As shown in Fig. 10, each wing is provided in its under surface, and substantially to its full length, with a downwardly opening channel 75, and contained in each channel is a vertically disposed fin-like member 76 that is attached pivotally at its outer end by a pivot pin or bolt 77 (see Fig. 3) and at its inner end is supported by a sliding connection, as at 78, with the outer end of a rocker lever 79, as best shown in Fig. 9, so that the fin may be adjusted between a position entirely housed within the wing channel, to a position extending below the wing surface as in Fig. 9. With the understanding that the fins will be extended from the wings or retracted thereinto in timing, it will then be understood that the fins be made to act as a propelling member in connection with the rotation of the wing. The means for control of the fins to effect propulsion and steering will now be explained.

Each rocker lever 79 is supported intermediate its ends by a pivot bolt 80 for vertical action and at its inner end is pivotally connected by a short link 81 with the upper end of a vertically disposed adjusting rod 82 having guided endwise mounting in bearings 83 and 84. Bearings 83 are fixed to the hub portion 16 of the air screw, and bearings 84 are formed in the body portion of gear wheel 20 by which the screw is driven.

At their lower ends, the rods 82 are equipped with spaced rollers 85—85 adapted to travel in contact with the upper and lower surfaces of a circular cam 86 that is mounted for rotary adjustment on the screw mounting spindle 13 below the gear wheel 20.

As seen in Fig. 9, the cam has a gear toothed band 90 cast about its lower end and a beveled gear pinion 91 on a crank shaft 92 rotatable in a bearing 93 which may be rotated by the shaft to effect rotary adjustment of the cam about the spindle.

Each cam has peripheral parts thereof at opposite sides of a diametrical line, designated in Fig. 9 at 86a and 86b, set at different levels, thus, as the screw turns relative to the cam, to cause the rods 82 to be shifted endwise to different positions, and in this way to actuate the corresponding fins 76 into or from their respective wings.

It is to be understood that the propelling action is imparted by the fin only when extended. Therefore, by determining the location of the arc of travel for each screw as rotating about its spindle that the fins are made effective, the direction of travel may be controlled. For example, in consideration of the parts as shown in Fig. 1, and assuming the travel to be in the direction of the arrow at the right-hand end, and the screws 15 and 15' rotating in the direction indicated by arrows B and B', should the propulsion fins of the wings of the forward screw be made effective through the arc defined by the double pointed arrow C, and the fins of the wings of the rearward screw be made effective during the arc of the double pointed arrow C', then the propelling forces of each screw will be balanced with respect to the longitudinal line of travel and effect a direct forward travel. If there should be any deviation from this direct travel, the propulsion arc of one or the other screw could be changed as required to correct the deflection.

For turning the craft, the cams 86 would be adjusted so as to cause the propulsion arcs of the screws to be toward opposite lateral directions, or only one cam might be altered for this directional change, depending upon whether a sharp or long turn is to be made.

Likewise, the cams might be so adjusted or moved as to cause the propelling effect of each screw to be in a direct sidewise direction, or to act as a forward braking force.

In brief, through the proper rotative adjustment and location of the cams 86 on their respective spindles, the fins 76 of the wings of the dual air screws may be made effective as required for propulsion of the craft in any direction; that is, forward, and lateral for turning, braking and steering control.

I have shown the cams as being individually controlled through the provision of the gears 90 and 91 and crank shafts 92. I have not shown the control devices for the ailerons except to the extent of the rods 67 and 68 in Fig. 3. However, it is here explained that these rods, for each air screw, would extend to a suitable control which might be a stick as used in conventional types of airplanes, for aileron control.

With the aircraft so equipped with dual air screws, rotating in opposite directions, and the wings of each equipped with the propulsion fins and ailerons, as described, and these operable under the controls shown and described, it is possible to soar directly upward; to travel at high speed under the propelling forces, to move laterally, to turn abruptly or slowly and to have positive directional control at all times.

Having thus described by invention, what I claim as new therein and desire to secure by Letters Patent is:

1. An air screw for helicopter type aircraft comprising a plurality of rigid radial wings, each having an aileron at its outer end, means for controlling the action and position of the ailerons, and each wing having a propulsion fin mounted longitudinally therein and extending substantially the full length thereof and perpendicular to the plane of rotation, adapted to be extended downwardly therefrom during a part of the rotation of the screw and retracted during the remaining part to cause a horizontally directed propelling force to be applied thereby to the craft.

2. In an aircraft of the helicopter type, an airscrew mounted therein to revolve about a vertical axis for lifting the craft, and comprising a plurality of radially extended wings; each wing having a longitudinal slot in its under side and extending substantially to its full length, a fin disposed therein and extended the full length of the slot, means pivotally securing the fin in the slot at its outer end, and a control member in the wing and connected with the fin at its inner end to adjust the fin about its outer end support from a position enclosed within the slot to a position adjusted outwardly therefrom.

3. A structure as recited in claim 2 wherein said wing is revoluble about a vertical hub and wherein a cam ring encircles the hub and a cam follower is mounted to turn with the wing, said cam follower having an operating connection with the said fin control member for the actuation of the latter.

4. A structure as recited in claim 2 wherein said wing is revoluble about a vertical hub and wherein a cam ring encircles the hub and a cam follower is mounted to turn with the wing, said cam follower having an operating connection with the said fin control member for the actuation of the latter said cam ring being rotatably adjustable about the hub axis to determine the position of the wing relative to the aircraft when the said fin is extended.

ROBERT E. MULLIN.

REFERENCES CITED

The following references are of record in the file of this patent:

UNITED STATES PATENTS

| Number | Name | Date |
| --- | --- | --- |
| 1,449,129 | Pescara | Mar. 20, 1923 |
| 1,819,075 | Darr | Aug. 28, 1931 |
| 1,836,406 | Smith | Dec. 15, 1931 |
| 1,912,354 | Pescara | May 30, 1933 |
| 1,989,708 | Marriage | Feb. 5, 1935 |
| 2,233,747 | Riedl | Mar. 4, 1941 |
| 2,372,481 | Gagas | Mar. 27, 1945 |
| 2,384,445 | Apostolescu | Sept. 11, 1945 |
| 2,414,435 | Bendix | Jan. 21, 1947 |
| 2,443,393 | Landgraf | June 15, 1948 |
| 2,445,354 | Hoppes | July 20, 1948 |